US009325266B2

(12) United States Patent
Tsai et al.

(10) Patent No.: US 9,325,266 B2
(45) Date of Patent: Apr. 26, 2016

(54) DC MOTOR CONTROL METHOD AND DC MOTOR CONTROL CIRCUIT

(71) Applicant: ANPEC ELECTRONICS CORPORATION, Hsinchu (TW)

(72) Inventors: Ming-Jung Tsai, Changhua County (TW); Chia-Tai Yang, Tainan (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 64 days.

(21) Appl. No.: 14/500,709

(22) Filed: Sep. 29, 2014

(65) Prior Publication Data
US 2015/0365030 A1 Dec. 17, 2015

(30) Foreign Application Priority Data

Jun. 13, 2014 (TW) .............................. 103120495 A

(51) Int. Cl.
G05B 11/28 (2006.01)
H02P 7/29 (2006.01)
(52) U.S. Cl.
CPC ........................................ H02P 7/29 (2013.01)
(58) Field of Classification Search
CPC ........................................................ H02P 6/00
USPC .................. 318/139, 400.01, 400.02, 400.14,
318/400.15, 700, 701, 721, 799, 800, 801,
318/807, 430, 432, 599, 811; 363/21.1, 26,
363/40, 95, 124, 174, 175; 327/134, 140
See application file for complete search history.

(56) References Cited

U.S. PATENT DOCUMENTS

| 4,295,189 | A | * | 10/1981 | Boys | ....................... H02P 27/08 318/811 |
| 8,193,743 | B2 | * | 6/2012 | Yamada | ............ H02M 7/53875 318/162 |
| 8,536,810 | B2 | * | 9/2013 | Yamada | .................. H02P 27/04 318/400.09 |
| 2004/0080293 | A1 | * | 4/2004 | Kurosawa | ............... H02P 6/182 318/400.11 |
| 2005/0248306 | A1 | * | 11/2005 | Chen | ..................... H02P 25/023 318/712 |

FOREIGN PATENT DOCUMENTS

| CN | 101345509 A | 1/2009 |
| TW | 200614650 A | 5/2006 |
| TW | 200845562 A | 11/2008 |
| TW | M416935 | 11/2011 |

* cited by examiner

*Primary Examiner* — Antony M Paul
(74) *Attorney, Agent, or Firm* — Li & Cai Intellectual Property (USA) Office

(57) ABSTRACT

The present disclosure provides a DC motor control method comprising comparing a first periodic signal and a second periodic signal for generating a control signal, wherein the frequency of the first periodic signal is lower than the frequency of the second periodic signal; configuring the amplitudes of the first periodic signal and the second periodic signal according to the needed speed of the DC motor, wherein increasing the ratio of the amplitude of the first periodic signal to the amplitude of the second periodic signal when the needed speed of the DC motor is increased, and decreasing the ratio of the amplitude of the first periodic signal to the amplitude of the second periodic signal when the needed speed of the DC motor is decreased.

10 Claims, 10 Drawing Sheets

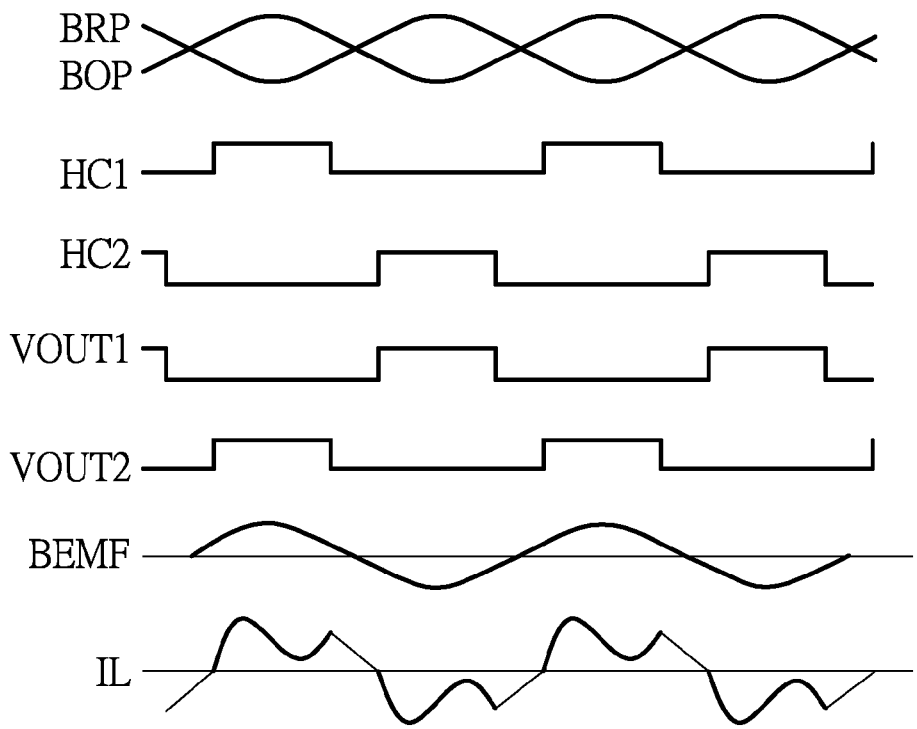

FIG.2(PRIOR ART)

```
┌─────────────────────────────────────────────┐
│ comparing a first periodic signal and a     │
│ second periodic signal for generating a     │
│ control signal, wherein the frequency of    │──S100
│ the first periodic signal is lower than the │
│ frequency of the second periodic signal     │
└─────────────────────────────────────────────┘
                      ↓
┌─────────────────────────────────────────────┐
│ configuring the amplitudes of the first     │
│ periodic signal and the second periodic     │
│ signal according to the needed speed of the │
│ DC motor, wherein increasing the ratio of   │
│ the amplitude of the first periodic signal  │
│ to the amplitude of the second periodic     │──S110
│ signal when the needed speed of the DC      │
│ motor is increased, and decreasing the      │
│ ratio of the amplitude of the first periodic│
│ signal to the amplitude of the second       │
│ periodic signal when the needed speed of    │
│ the DC motor is decreased                   │
└─────────────────────────────────────────────┘
```

FIG.3

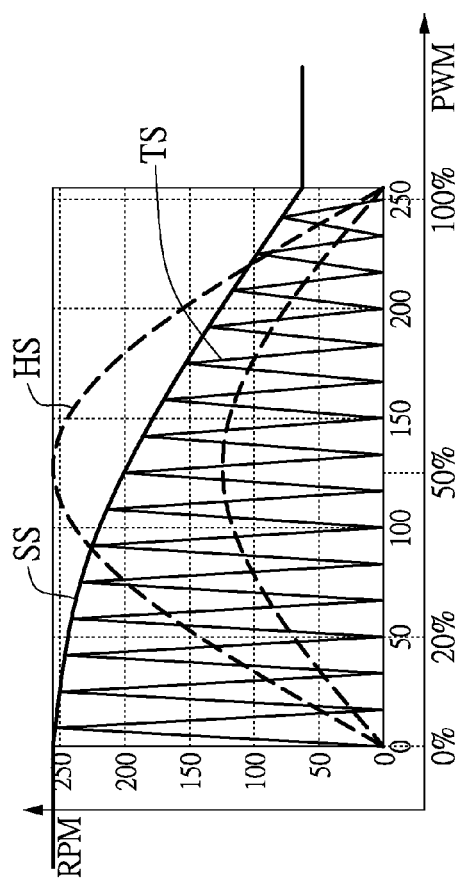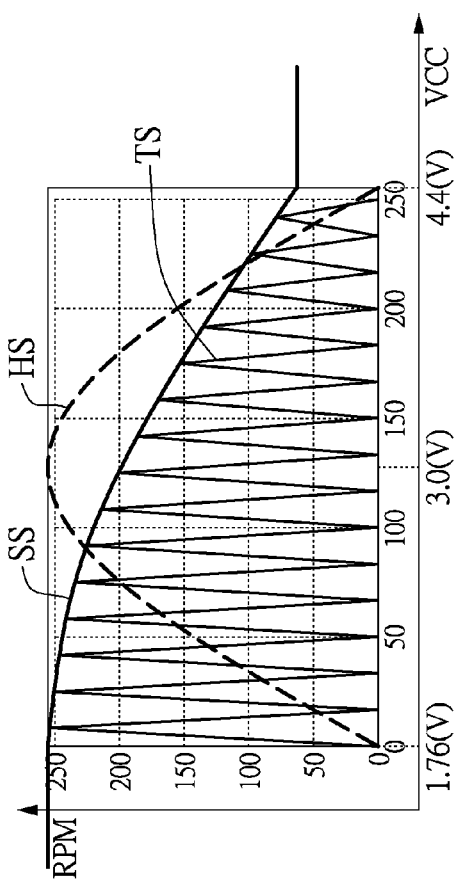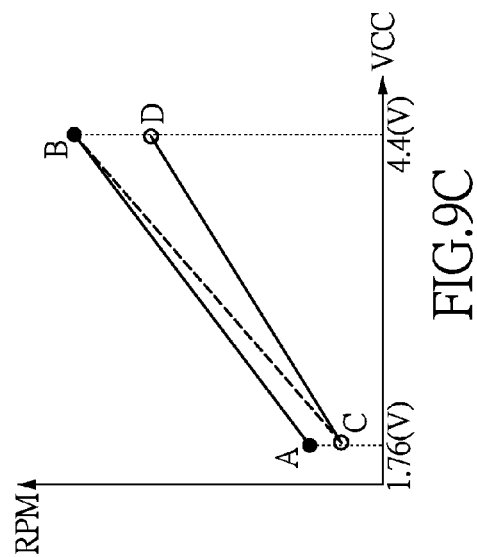
FIG.9A
FIG.9B
FIG.9C

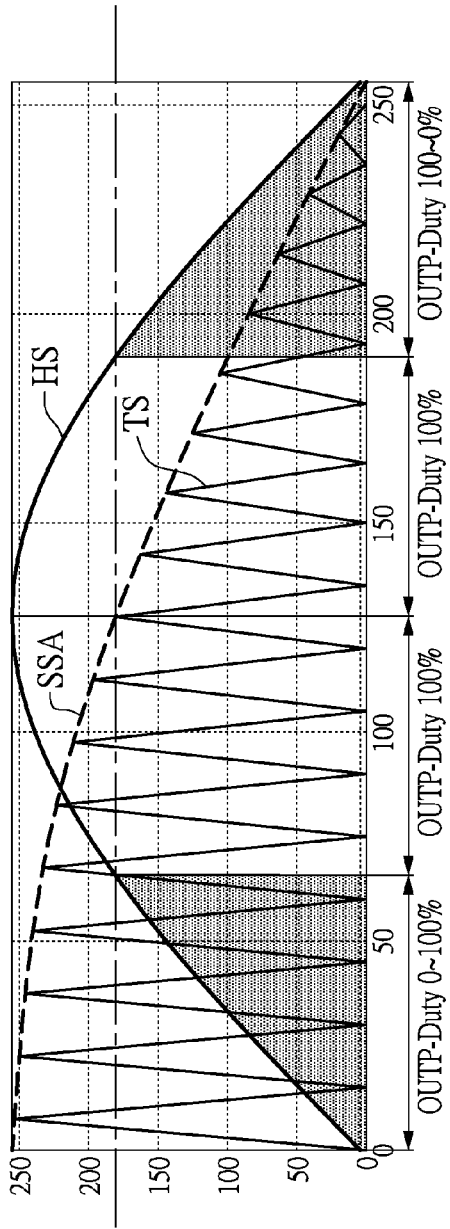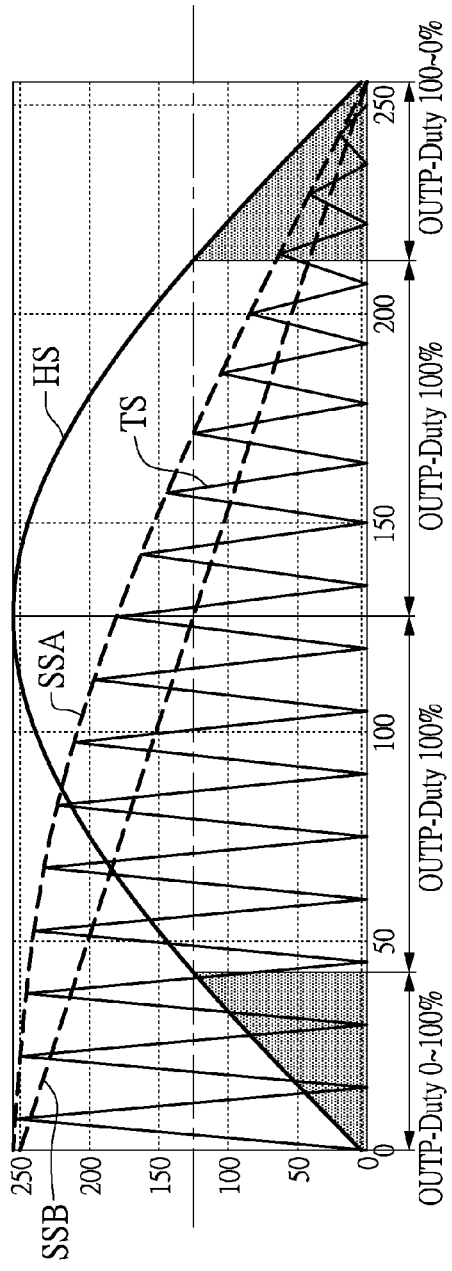

DC MOTOR CONTROL METHOD AND DC MOTOR CONTROL CIRCUIT

BACKGROUND OF THE INVENTION

1. Field of the Invention

The instant disclosure relates to a DC motor control method; in particular, to a DC motor control method and a DC motor control circuit.

2. Description of Related Art

The DC motor has been widely used in many electronic products, such as personal computers, electric shavers, copiers, projectors, blenders and other kinds of low voltage electronic products. With the advancement of technology, demand for personal computers with high performance has also increased continuously. For a personal computer with high performance, temperature of a host rises easily because of the increase of the operation speed of the central processing unit in the unit time. Therefore, the new generation of personal computers needs to use fans with DC motors for cooling, and thus DC motor fans play a decisive role in the miniature heat-dissipation fan system. For the above reasons, it is important to provide a circuit and control method thereof for stabilizing operation of the DC motor.

Referring to FIGS. 1 and 2, FIG. 1 shows a circuit block schematic diagram of the control circuit of the single-phase DC motor in the prior art. FIG. 2 shows a waveform schematic diagram of the output signal in FIG. 1. The control circuit of the single-phase DC motor senses a magnetic pole position of an inner rotator of the single-phase DC motor 130 through utilizing a hall element HAL, and accordingly generates a first sinusoidal wave signal BOP and a second sinusoidal wave signal BRP. After the first sinusoidal wave signal BOP and the second sinusoidal wave signal BRP are transmitted to the comparator RP1 and RP2, the comparator RP1 and RP2 respectively outputs hall signals HC1 and HC2 according to a comparison operation. Next, the logic circuit 112 receives a pulse modulation signal PW generated from the external PWM generator 120 and the hall signals HC1 and HC2 so as to respectively output the switch signal H1, H2, L1 and L2 for controlling the switched-on or switched-off state of each switch unit (not shown) in the driving circuit 114. Afterwards, the driving circuit 114 alternatively outputs the first output signal VOUT1 and the second output signal VOUT2 to the single-phase DC motor 130 for making the single-phase DC motor 130 rotate.

However, when the single-phase DC motor 130 rotates, a Back Electro-Motive Force (BEMF) must be generated in the single-phase DC motor 130, wherein polarity of the BEMF is opposite to that of the applied voltage. Therefore, a current flowing through the single-phase DC motor 130 may be affected by the BEMF, so that a current flowing through the single-phase DC motor 130 may generate change correspondingly, for example the waveform of saddle-type current shown in FIG. 2. Accordingly, in the phase-changing duration of outputting the first output signal VOUT1 and the second output signal VOUT2 (that is the voltage level of the hall signals HC1 and HC2 are low voltage level), the current flowing through the single-phase DC motor 130 may change sharply (for example higher tail current value of the saddle-type current). The sharply changing current will affect operation of the single-phase DC motor 130, so as to generate mechanical noise when the single-phase DC motor 130 rotates.

SUMMARY OF THE INVENTION

According to an embodiment of the instant disclosure, a DC motor control method is provided. The DC motor control method comprises: comparing a first periodic signal and a second periodic signal for generating a control signal, wherein the frequency of the first periodic signal is lower than the frequency of the second periodic signal; and then configuring the amplitudes of the first periodic signal and the second periodic signal according to the needed speed of the DC motor, wherein the ratio of the amplitude of the first periodic signal to the amplitude of the second periodic signal is quickly increased (for example increasing the amplitude of the first periodic signal and decreasing the amplitude of the second periodic signal at the same time) when the needed speed of the DC motor is increased, and the ratio of the amplitude of the first periodic signal to the amplitude of the second periodic signal is quickly decreased (for example decreasing the amplitude of the first periodic signal and increasing the amplitude of the second periodic signal at the same time) when the needed speed of the DC motor is decreased. Thus, the motor would fit in with the requirements of high speed in the high speed range and low noise characteristic in slow speed range.

According to an embodiment of the instant disclosure, a DC motor control circuit is provided. The DC motor control circuit comprises a positive full-wave signal generator, a triangular wave signal generator and a first comparator. The positive full-wave signal generator outputs a positive full-wave signal, wherein the waveform of the positive full-wave signal is a sinusoidal wave. The triangular wave signal generator outputs a triangular wave signal, wherein the frequency of the positive full-wave signal is lower than the frequency of the triangular wave signal. The first comparator is connected to the positive full-wave signal generator and the triangular wave signal generator. The first comparator is used for receiving the positive full-wave signal and the triangular wave signal, and processing a comparison operation for the positive full-wave signal and the triangular wave signal to output a control signal. The amplitudes of the positive full-wave signal and the triangular wave signal are configured according to the needed speed of the DC motor. When the needed speed of the DC motor is increased, increasing the ratio of the amplitude of the positive full-wave signal to the amplitude of the triangular wave signal. When the needed speed of the DC motor is decreased, decreasing the ratio of the amplitude of the positive full-wave signal to the amplitude of the triangular wave signal.

In summary, the provided DC motor control method and the DC motor control circuit quickly increases or decreases the amplitudes of the first periodic signal and the second periodic signal (or compares the positive full-wave signal and the triangular wave signal), and compares the two signals to generate the control signal for controlling the speed of the DC motor. Therefore, for the high speed requirement, the DC motor can achieve higher speed due to larger amplitude ratio of the first periodic signal to the second periodic signal. On the other hand, for the low noise requirement of slow speed, the DC motor can achieve very slow speed due to smaller amplitude ratio of the first periodic signal to the second periodic signal, meanwhile the control signal is a periodic modulation signal having variation close to a sinusoidal wave, thus variation of the DC motor current would also be close to a sinusoidal wave, which characteristics avoid the phenomenon of sharply changing current of the DC motor in the phase-changing duration, in order to improve the low noise ability.

In order to further the understanding regarding the instant disclosure, the following embodiments are provided along with illustrations to facilitate the disclosure of the instant disclosure.

BRIEF DESCRIPTION OF THE DRAWINGS

FIG. 2 shows a waveform schematic diagram of the output signal in FIG. 1;

FIG. 3 shows a flow chart of a DC motor control method according to an embodiment of the instant disclosure;

FIG. 9A shows a waveform schematic diagram for the triangular wave signal varies as the duty when the DC motor control method is applied to PWM mode according an embodiment of the instant disclosure;

FIG. 9B shows a waveform schematic diagram for the triangular wave signal varies as the driving voltage when the DC motor control method is applied to voltage-controlled mode according an embodiment of the instant disclosure;

FIG. 9C shows a waveform schematic diagram for the speed of the DC motor versus the voltage of the control signal according to the DC motor control method of an embodiment of the instant disclosure;

FIG. 10A shows a waveform schematic diagram for the amplitude of the triangular wave signal varies as the duty based on sine function according to the DC motor control method of an embodiment of the instant disclosure; and FIG. 10B shows a waveform schematic diagram for the amplitude of the triangular wave signal varies as the duty based on linear function according to the DC motor control method of an embodiment of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Please refer to FIG. 3 showing a flow chart of a DC motor control method according to an embodiment of the instant disclosure. First, in step S100, comparing a first periodic signal and a second periodic signal for generating a control signal, wherein the frequency of the first periodic signal is lower than the frequency of the second periodic signal. The first periodic signal may be a positive full-wave signal, for example. The second periodic signal may be a triangular wave signal, for example, but the instant disclosure is not so restricted. For example, the first periodic signal and the second periodic signal may both be the positive full-wave signal. Then, in step S110, configuring the amplitudes of the first periodic signal and the second periodic signal according to the needed speed of the DC motor, wherein increasing the ratio of the amplitude of the first periodic signal to the amplitude of the second periodic signal when the needed speed of the DC motor is increased, and decreasing the ratio of the amplitude of the first periodic signal to the amplitude of the second periodic signal when the needed speed of the DC motor is decreased. The mentioned DC motor may operate in PWM (pulse width modulation) mode, the control signal may be a pulse width modulation signal (which is the pulse width modulation signal PU' in the embodiment in FIG. 4A), and the speed of the DC motor is controlled by the pulse width modulation signal. Moreover, the DC motor may also operate in voltage-controlled mode, the driving voltage (VCC) generates the control signal to drive the DC motor, and the speed of the DC motor is controlled by the voltage value of the driving voltage. In one embodiment, at least one of the first periodic signal and the second periodic signal is adjustable. For example, when the second periodic signal is a triangular wave signal, the amplitude of the triangular wave signal is adjustable, and so decreasing the amplitude of the triangular wave signal when the needed speed of the DC motor is increased, and increasing the amplitude of the triangular wave signal when the needed speed of the DC motor is decreased, and the amplitude of the triangular wave signal varies according to a sine function. Details of the steps S100 and S110 will be further described in the following embodiments.

Figure 4A:
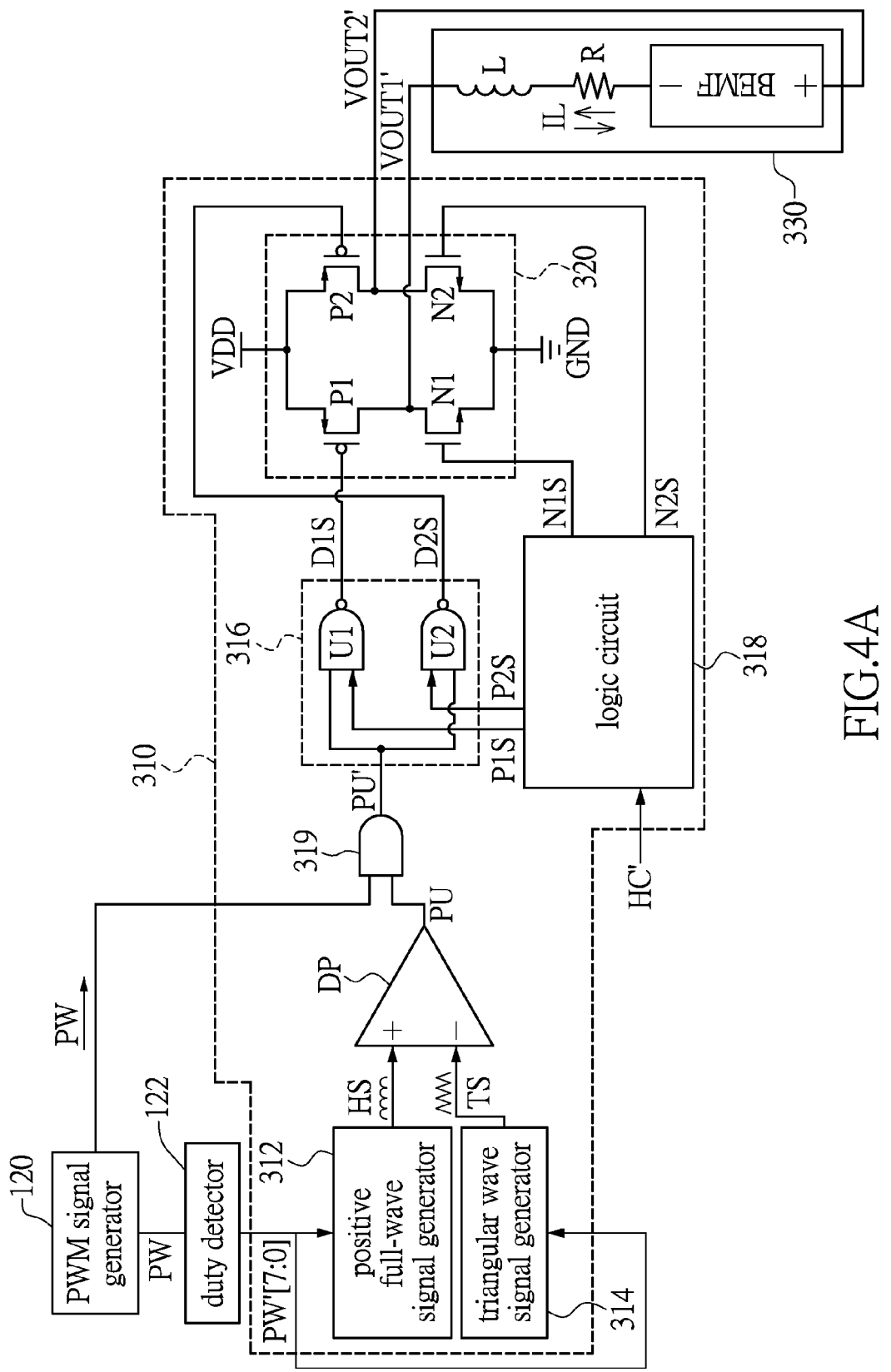
FIG. 4A shows a circuit block schematic diagram of the control circuit operating in PWM mode of the single-phase DC motor according to an embodiment of the instant disclosure.

Please refer to FIG. 3 in conjunction with FIG. 4A. FIG. 4A shows a circuit block schematic diagram of the control circuit operating in PWM mode of the single-phase DC motor according to an embodiment of the instant disclosure. The circuit in FIG. 4A applies the DC motor control method in FIG. 3 to control the signal-phase DC motor which is only for explanation, but the instant disclosure is not so restricted. The DC motor control method of this embodiment could be applied to any type of DC motor, such as a two-phase or three-phase DC motor, and so on. The step S100 in FIG. 3 can be implemented by the first comparator DP shown in FIG. 4A. The step S110 in FIG. 3 can be implemented by adjusting the amplitude of at least one of the positive full-wave signal HS generated by the positive full-wave signal generator 312 and the triangular wave signal TS generated by the triangular wave signal generator 314. The single-phase DC motor control circuit 310, shown in FIG. 4A, is described first, for further understanding the implementation of steps S100 and S110 in FIG. 3. The DC motor control circuit in FIG. 4A comprises the positive full-wave signal generator 312, the triangular wave signal generator 314 and the first comparator DP. The positive full-wave signal generator 312 outputs the positive full-wave signal HS, wherein the waveform of the positive full-wave signal HS is a sinusoidal wave. The triangular wave signal generator 314 outputs the triangular wave signal TS, wherein the frequency of the positive full-wave signal HS is lower than the frequency of the triangular wave signal TS. The first comparator DP is connected to the positive full-wave signal generator 312 and the triangular wave signal generator 314. The first comparator DP is used for receiving the positive full-wave signal HS and the triangular wave signal TS, and processing a comparison operation for the positive full-wave signal HS and the triangular wave signal TS to output a control signal (which is the pulse width modulation signal PU in FIG. 4A). The amplitudes of the positive full-wave signal HS and the triangular wave signal TS are configured according to the needed speed of the DC motor. When the needed speed of the DC motor is increased, increasing the ratio of the amplitude of the positive full-wave signal HS to the amplitude of the triangular wave signal TS. When the needed speed of the DC motor is decreased, decreasing the ratio of the amplitude of the positive full-wave signal HS to the amplitude of the triangular wave signal TS. It is worth mentioning that the periods of the positive full-wave signal and the triangular wave signal respectively generated by the positive full-wave signal generator 312 and the triangular wave signal generator 314 can be changed according to the practical needed speed of the DC motor, which means that the periods of the positive full-wave and the triangular wave are not constant, and not unchangeable. Specifically, the PWM generator 120 generates the pulse width modulation signal PW, and the duty detector 122 detects the duty of the pulse width modulation signal PW for accordingly generating the amplitude adjusting signal PW'. According to the detection result, the duty detector 122 transmits the amplitude modulation signal PW' to the positive full-wave signal generator 312 and the triangular wave signal generator 314 to adjust the amplitudes of the positive full-wave signal HS and the triangular wave signal TS. The amplitude adjusting signal PW' may be a digital signal, such as the digital signal with eight bits, or ten bits, but the instant disclosure is not so restricted. In other embodiments, the duty detector 122 may generate two different amplitude adjusting signals for respectively controlling the amplitude of the signal generated by the positive full-wave signal generator 312 and the amplitude of the signal generated by the triangular wave signal generator 314.

The single-phase DC motor control circuit 310 comprises the positive full-wave generator 312, the triangular wave generator 314, the first comparator DP, the AND gate 319, the switching circuit 316, the logic circuit 318 and the driving circuit 320. The first comparator DP is electrically connected to the positive full-wave generator 312 and the triangular wave generator 314. The switching circuit 316 is electrically connected to the first comparator DP through the AND gate 319, and the switching circuit 316 is electrically connected to the logic circuit 318. The driving circuit 320 is electrically connected to the switching circuit 316 and the logic circuit 318, and the driving circuit 320 is further electrically connected to the single-phase DC motor 330. The single-phase DC motor 330 is represented with an equivalent inductor L, an equivalent resistor R and a reaction force BEMF.

Regarding the positive full-wave generator 312, the positive full-wave generator 312 is used for generating the positive full-wave signal HS. In another embodiment, the positive full-wave generator 312 receives the amplitude modulation signal PW', and accordingly modulates the amplitude of the positive full-wave signal HS.

Regarding the triangular wave generator 314, the triangular wave generator 314 is used for generating the triangular wave signal TS. In another embodiment, the triangular wave signal generator 314 receives the amplitude modulation signal PW' to modulate the amplitude of the triangular wave signal TS. For the step S110 adjusting the ratio of the amplitude of the first periodic signal (positive full-wave signal HS) to the amplitude of the second periodic signal (triangular wave signal TS), the amplitude of the triangular wave signal TS may be larger than or equal to the amplitude of the positive full-wave signal HS, or the triangular wave signal TS may be smaller than the amplitude of the positive full-wave signal HS.

Regarding the first comparator DP, the first comparator DP is used for receiving the positive full-wave signal HS and the triangular wave signal TS, and further compares the positive full-wave signal HS with the triangular wave signal TS. Furthermore, in the present embodiment, a positive input terminal of the first comparator DP receives the positive full-wave signal HS, and a negative input terminal of the first comparator DP receives the triangular wave signal TS, and then the first comparator DP compares the positive full-wave signal HS and the triangular wave signal TS so as to generate a pulse width modulation signal PU (which is corresponding to the control signal of the step S100), wherein frequency of the positive full-wave signal HS is lower than that of the triangular wave signal TS.

Figure 1:
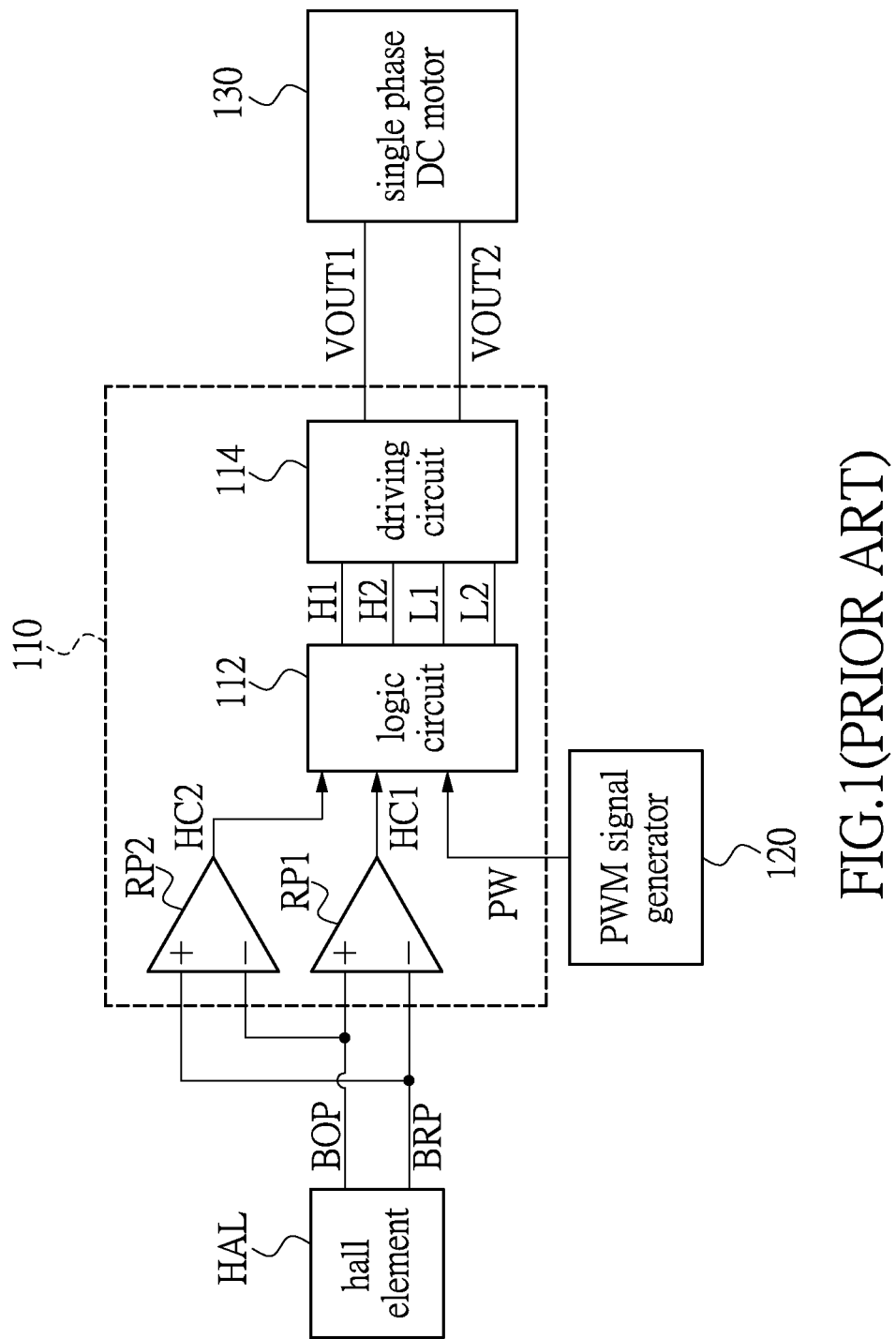
FIG. 1 shows a circuit block schematic diagram of the control circuit of the single-phase DC motor in the prior art.

The AND gate 319 performs the logic AND operation for the pulse width modulation PW generated by the conventional PWM generator 120 and the pulse width modulation signal PU, and outputs the pulse width modulation signal PU'. For example, the pulse width modulation signal PU may be a periodic signal with characteristic of sinusoidal wave which changes from 0%-duty to 100%-duty, then changes from 100%-duty to 0%-duty. After pulse width modulation signal PU being processed by the AND operation with the pulse width modulation signal PW of 50%-duty, the pulse width modulation signal PU' would be the periodic signal which changes from 0%-duty to 50%-duty and then changes from 50%-duty to 0%-duty. The pulse width modulation signal PU' would not be a periodic signal with constant 50%-duty. In short, the pulse width modulation signal PU generated by the first comparator DP is for adjusting the pulse width modulation PW generated by the conventional PWM generator 120, in order to achieve the purpose of smoothing the current of the DC motor. In other words, based on the pulse width modulation signal PU, the AND gate 319 can cooperate with the external pulse width modulation signal PW to generate the new pulse width modulation signal PU'. The generated pulse width modulation signal PU' is essentially the same as the pulse width modulation signal PU. And, as mentioned in the embodiment in FIG. 1, the conventional pulse width modulation signal PW is only for adjusting the operating point according to the speed of the DC motor, which will be further described in the embodiment of FIG. 7.

Regarding the logic circuit 318, the logic circuit 318 receives a phase-changing signal HC' and detects the state of voltage level of the phase-changing signal HC', accordingly to output a first logic signal P1S, a second logic signal P2S, a third logic signal N1S and a fourth logic signal N2S with high voltage level or low voltage level. Furthermore, in the present embodiment, the waveform of the first logic signal P1S is equal to that of the fourth logic signal N2S; which means, the same voltage level. The waveform of the second logic signal P2S is equal to that of the third logic signal N1S; which means, the same voltage level. It is worth mentioning that the phase-changing signal HC' received by the logic circuit 318 can be generated by the hall element in FIG. 1 cooperating with the comparing circuit, and an artisan of ordinary skill in the art will appreciate the implementation manner of the phase-changing signal, thus there is no need to go into detail.

Regarding the switching circuit 316, the switching circuit 316 receives the pulse width modulation signal PU', the first logic signal P1S and the second logic signal P2S. The switching circuit 316 outputs a first direction driving signal D1S according to the pulse width modulation signal PU' and the first logic signal P1S, and the switching circuit 316 outputs a second direction driving signal D2S according to the pulse width modulation signal PU' and the second logic signal P2S. In the present embodiment, when voltage level of the first logic signal P1S is high voltage level, phase of the first direction driving signal D1S is opposite to that of the pulse width modulation signal PU'; when voltage level of the first logic signal P1S is low voltage level, voltage level of the first direction driving signal D1S is high voltage level. On the other hand, when voltage level of the second logic signal P2S is high voltage level, phase of the second direction driving signal D2S is opposite to that of the pulse width modulation signal PU', and when voltage level of the second logic signal P2S is low voltage level, voltage level of the second direction driving signal D2S is high voltage level. The phase of the first logic signal P1S is opposite to that of the second logic signal P2S.

Regarding the driving circuit 320, the driving circuit 320 receives the first direction driving signal D1S, the second direction driving signal D2S, the third logic signal N1S and the fourth logic signal N2S. The driving circuit 320 receives the first direction driving signal D1S and the fourth logic signal N2S, and accordingly outputs the first output signal VOUT1' to the single-phase DC motor 330. The driving circuit 320 receives the second direction driving signal D2S and the third logic signal N1S, and accordingly outputs the second output signal VOUT2' to the single-phase DC motor 330, so as to make the single-phase DC motor 330 operate.

Specifically, as shown in FIG. 4A, the switching circuit 316 comprises a first NAND gate U1 and a second NAND gate U2, and the driving circuit 318 comprises a first up-bridge transistor P1, a second up-bridge transistor P2, a first down-bridge transistor N1 and a second down-bridge transistor N2.

An input terminal of the first NAND gate U1 is respectively connected to an output terminal of the first comparator DP (through the AND gate 319) and the logic circuit 318, and an output terminal of the first NAND gate U1 is electrically connected to a gate of the first up-bridge transistor P1 of the driving circuit 320. An input terminal of the second NAND gate U2 is respectively connected to the output terminal of the first comparator DP (through the AND gate 319) and the logic circuit 318, and an output terminal of the second NAND gate U2 is electrically connected to a gate of the second up-bridge transistor P2 of the driving circuit 320. Source and gate of the first up-bridge transistor P1 are respectively connected to the system voltage VDD and the output terminal of the first NAND gate U1. Source and gate of the second up-bridge transistor P2 are respectively connected to the system voltage VDD and the output terminal of the second NAND gate U2. Drain and gate of the first down-bridge transistor N1 are respectively connected to drain of the first up-bridge transistor P1 and the logic circuit 318, and source of the first down-bridge transistor N1 is electrically connected to the ground voltage GND. Drain and gate of the second down-bridge transistor N2 are respectively connected to drain of the second up-bridge transistor P2 and the logic circuit 318, and source of the second down-bridge transistor N2 is electrically connected to the ground voltage GND.

Regarding the first NAND gate U1, the first NAND gate U1 respectively receives the pulse width modulation signal PU' and the first logic signal P1S, and outputs the first direction driving signal D1S to the gate of the first up-bridge transistor P1 for controlling switched-on or switched-off state of the first up-bridge transistor P1. In another embodiment, the first NAND gate U1 can also be composed from other logic gates, for example, the first NAND gate U1 can also consist of an and-gate and an inverter.

An input terminal of the first NAND gate U1 is respectively connected to an output terminal of the first comparator DP (through the AND gate 319) and the logic circuit 318, and an output terminal of the first NAND gate U1 is electrically connected to a gate of the first up-bridge transistor P1 of the driving circuit 320. An input terminal of the second NAND gate U2 is respectively connected to the output terminal of the first comparator DP (through the AND gate 319) and the logic circuit 318, and an output terminal of the second NAND gate U2 is electrically connected to a gate of the second up-bridge transistor P2 of the driving circuit 320. Source and gate of the first up-bridge transistor P1 are respectively connected to the system voltage VDD and the output terminal of the first NAND gate U1. Source and gate of the second up-bridge transistor P2 are respectively connected to the system voltage VDD and the output terminal of the second NAND gate U2. Drain and gate of the first down-bridge transistor N1 are respectively connected to drain of the first up-bridge transistor P1 and the logic circuit 318, and source of the first down-bridge transistor N1 is electrically connected to the ground voltage GND. Drain and gate of the second down-bridge transistor N2 are respectively connected to drain of the second up-bridge transistor P2 and the logic circuit 318, and source of the second down-bridge transistor N2 is electrically connected to the ground voltage GND.

Regarding the first NAND gate U1, the first NAND gate U1 respectively receives the pulse width modulation signal PU' and the first logic signal P1S, and outputs the first direction driving signal D1S to the gate of the first up-bridge transistor P1 for controlling switched-on or switched-off state of the first up-bridge transistor P1. In another embodiment, the first NAND gate U1 can also be composed from other logic gates, for example, the first NAND gate U1 can also consist of an and-gate and an inverter.

Regarding the second NAND gate U2, the second NAND gate U2 respectively receives the pulse width modulation signal PU' and the second logic signal P2S, and outputs the second direction driving signal D2S to the gate of the second up-bridge transistor P2 for controlling switched-on or switched-off state of the second up-bridge transistor P2. In another embodiment, the second NAND gate U2 may be also composed from other gates, for example, the second NAND gate U2 can consist of an and-gate and an inverter.

Regarding the first up-bridge transistor P1, the first up-bridge transistor P1 serves as a switch transistor, and receives the first direction driving signal D1S for determining switched-on or switched-off state itself accordingly, wherein the first up-bridge transistor P1 is a P-type metal oxide semiconductor transistor in the present embodiment.

Regarding the second up-bridge transistor P2, the second up-bridge transistor P2 serves as a switch transistor, and receives the second direction driving signal D2S for determining switched-on or switched-off state itself accordingly, wherein the second up-bridge transistor P2 is a P-type metal oxide semiconductor transistor in the present embodiment.

Regarding the first down-bridge transistor N1, the first down-bridge transistor N1 serves as a switch transistor, and receives the third logic signal N1S for determining switched-on or switched-off state itself accordingly, wherein the first down-bridge transistor N1 is an N-type metal oxide semiconductor transistor in the present embodiment.

Regarding the second down-bridge transistor N2, the second down-bridge transistor N2 serves as a switch transistor, and receives the four logic signal N2S for determining switched-on or switched-off state itself accordingly, wherein the second down-bridge transistor N2 is an N-type metal oxide semiconductor transistor in the present embodiment. Moreover, source of the second down-bridge transistor N2 is connected to the ground voltage GND.

Figure 4B:
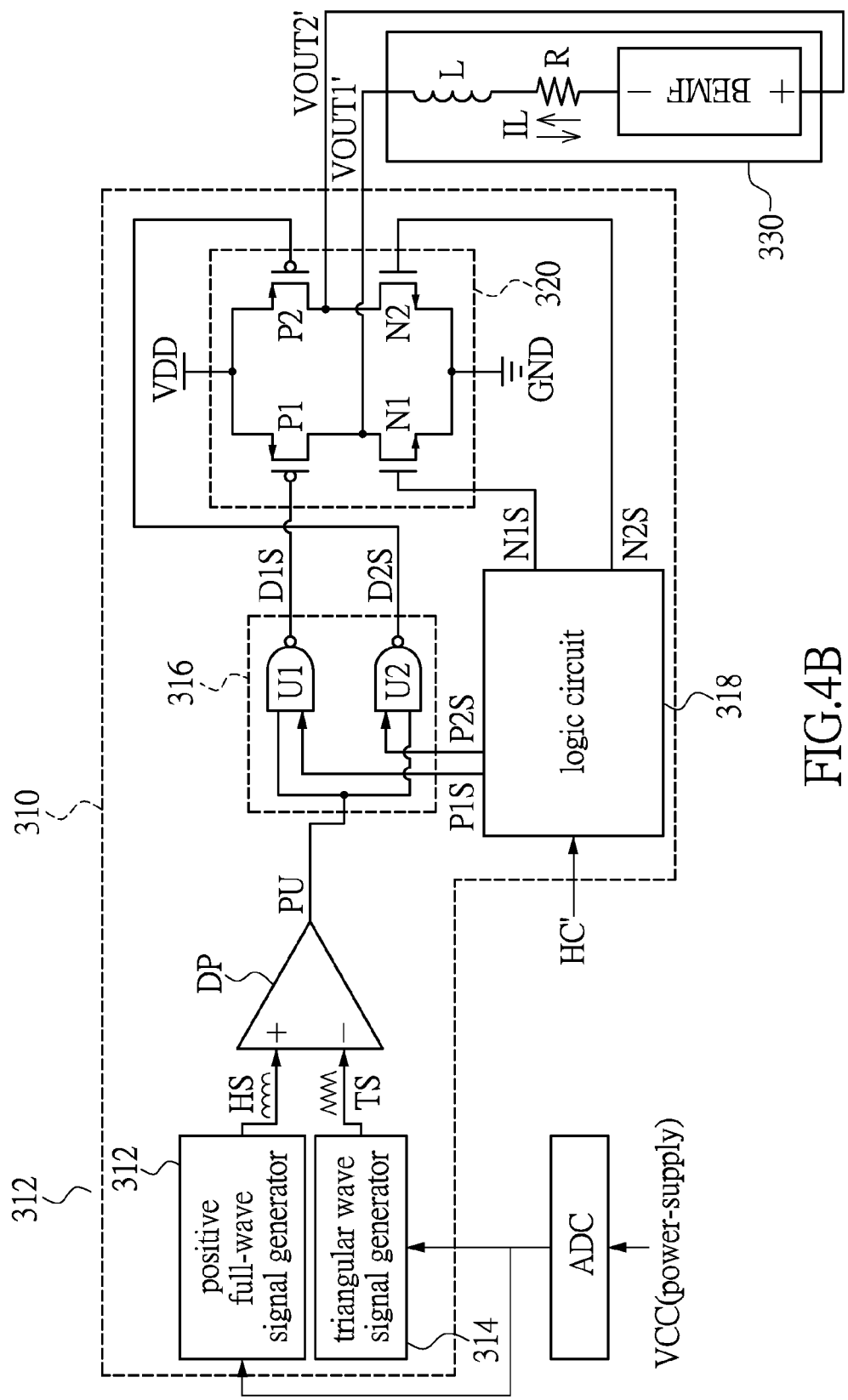
FIG. 4B shows a circuit block schematic diagram of the control circuit operating in voltage-controlled mode of the single-phase DC motor according to another embodiment of the instant disclosure.

Please refer to FIG. 4A in conjunction with FIG. 4B. FIG. 4B shows a circuit block schematic diagram of the control circuit operating in voltage-controlled mode of the single-phase DC motor according to another embodiment of the instant disclosure. The difference between the circuit of FIG. 4B and the circuit of FIG. 4A is that the circuit of FIG. 4B is for the DC motor operating in voltage-controlled mode. Therefore, the PWM generator 120 in FIG. 4A is removed, and the voltage VCC (which is digitalized by a analog-to-digital converter ADC) of the power supply is utilized to control the amplitude of the triangular wave signal TS generated by the triangular wave signal generator 314, and control the amplitude of the positive full-wave signal HS generated by the positive full-wave signal generator 312. The voltage VCC of the voltage-controlled mode is equivalent to the pulse width modulation signal PW of the pulse width modulation mode. An artisan of ordinary skill in the art will appreciate the difference of pulse width modulation mode and the voltage-controlled mode for controlling the DC motor, thus there is no need to go into detail.

Figure 5:
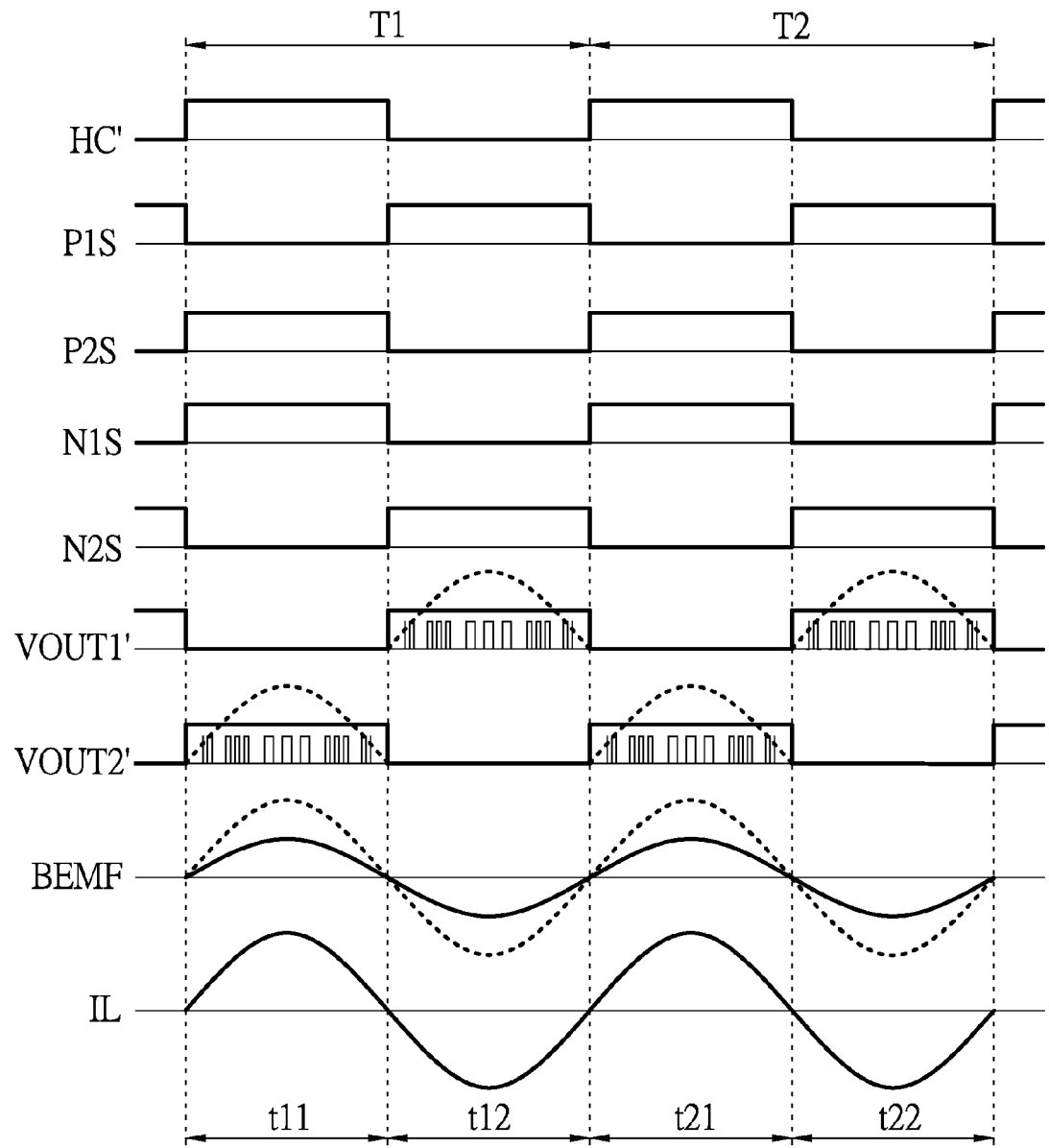
FIG. 5 shows a waveform schematic diagram of the output signal in FIG. 4A.

Please refer to FIG. 4A in conjunction with FIG. 5. FIG. 5 shows a waveform schematic diagram of the output signal in FIG. 4A. As shown in FIG. 5, the phase-changing signal HC' is a square wave signal which is periodic and illustrates the waveform with two periods T1 and T2 for instructing the instant disclosure, but the phase-changing signal HC' with two periods is not limited in the present embodiment. In the present embodiment, the period is divided into time interval t21 and t22. In the time interval t11 or t21, when the logic circuit 318 detects that voltage level of the phase-changing signal HC' is high voltage level, the logic circuit 318 may correspondingly output the second logic signal P2S and the third logic signal N1S with high voltage level, and the logic circuit 318 may concurrently output the first logic signal P1S and the fourth logic signal N2S with low voltage level. Next, the switching circuit 316 receives the logic signal P1S and P2S transmitted from the logic circuit 318 and receives the pulse modulation signal PU (for performing logic AND operation with the conventional pulse width modulation signal PW, and the pulse width modulation signal PU' is generated by the AND gate 319 shown in FIG. 4A) transmitted from the first comparator DP, so as to output the second direction driving signal D2S, which is opposite to phase of the pulse modulation signal PU, to the driving circuit 320, wherein the first direction driving signal D1S is a signal with high voltage level. Afterwards, at the time of receiving the first direction driving signal D1S and the second direction driving signal D2S for the driving circuit 320, the driving circuit 320 still receives the third logic signal N1S with high voltage level and the fourth logic signal N2S with low voltage level, and accordingly modulates the second output signal VOUT2' to the signal equivalent (or similar) to the sinusoidal signal with positive half-wave and then transmits the second output signal VOUT2' to the single-phase DC motor 330. It is to be noted that voltage level of the first output signal VOUT1' is maintained at the low voltage level in the time interval t11 or t21. In short, the instant disclosure is able to modulate the second output signal VOUT2' to the signal equivalent (or similar) to the sinusoidal signal with positive half-wave, mainly through the second direction driving signal D2S, wherein phase of the second direction driving signal D2S is opposite to that of the pulse modulation signal PU.

It is worth mentioning that the first output signal VOUT1 and the second output signal VOUT2 are similar to the pulse width modulation signal PU which is the square wave signal with gradually changing period. Relatively, FIG. 5 only conceptually describes the first output signal VOUT1' and the second output signal VOUT2' varying with the period of the sinusoidal wave, indicating effect of the change of the sinusoidal voltage (presented in dashed line).

On the other hand, in the time interval t12 or t22, when the logic circuit 318 detects that voltage level of the phase-changing signal HC' is low voltage level, the logic circuit 318 correspondingly outputs the first logic signal P1S and the fourth logic signal N2S with high voltage level and the logic circuit 318 outputs the second logic signal P2S and the third logic signal N1S with low voltage level concurrently. Next, the switching circuit 316 receives the logic signal P1S and P2S transmitted from the logic circuit 318 and receives the pulse modulation signal PU (for performing logic AND operation with the conventional pulse width modulation signal PW, and the pulse width modulation signal PU' is generated by the AND gate 319 shown in FIG. 4A) transmitted from the first comparator DP, so as to output the first direction driving signal D1S to the driving circuit 320, wherein phase of the first direction driving signal D1S is opposite to that of the pulse modulation signal PU and the second direction driving signal D2S is a signal with high voltage level. Afterwards, at the time of receiving the first direction driving signal D1S and the second direction driving signal D2S for the driving circuit 320, the driving circuit 320 further receives the third logic signal N1S with low voltage level and the fourth logic signal N2S with high voltage level, and accordingly modulates the first output signal VOUT1' to the signal equivalent (or similar) to the sinusoidal signal with positive half-wave and then the driving circuit 320 transmits the first output signal VOUT1' to the single-phase DC motor 330. It is to be noted that voltage level of the second output signal VOUT2' maintains at the low voltage level in the time interval t12 or t22. In short, the instant disclosure is able to modulate the first output signal VOUT1' to the signal equivalent (or similar) to the sinusoidal signal with positive half-wave, mainly through the first direction driving signal D1S, wherein phase of the second output signal VOUT1' is opposite to that of the pulse modulation signal PU.

It is to be noted that, in the present embodiment, phase difference between the first output signal VOUT1' and the second output signal VOUT2' is 180 degrees, and the first output signal VOUT1' and the second output signal VOUT2' are alternatively transmitted to the single-phase DC motor 330 so as to make the single-phase DC motor 330 operate. Additionally, the waveform of the first logic signal P1S is equal to that of the fourth logic signal N2S, and the waveform of the second logic signal P2S is equal to that of the third logic signal N1S.

Figure 6:
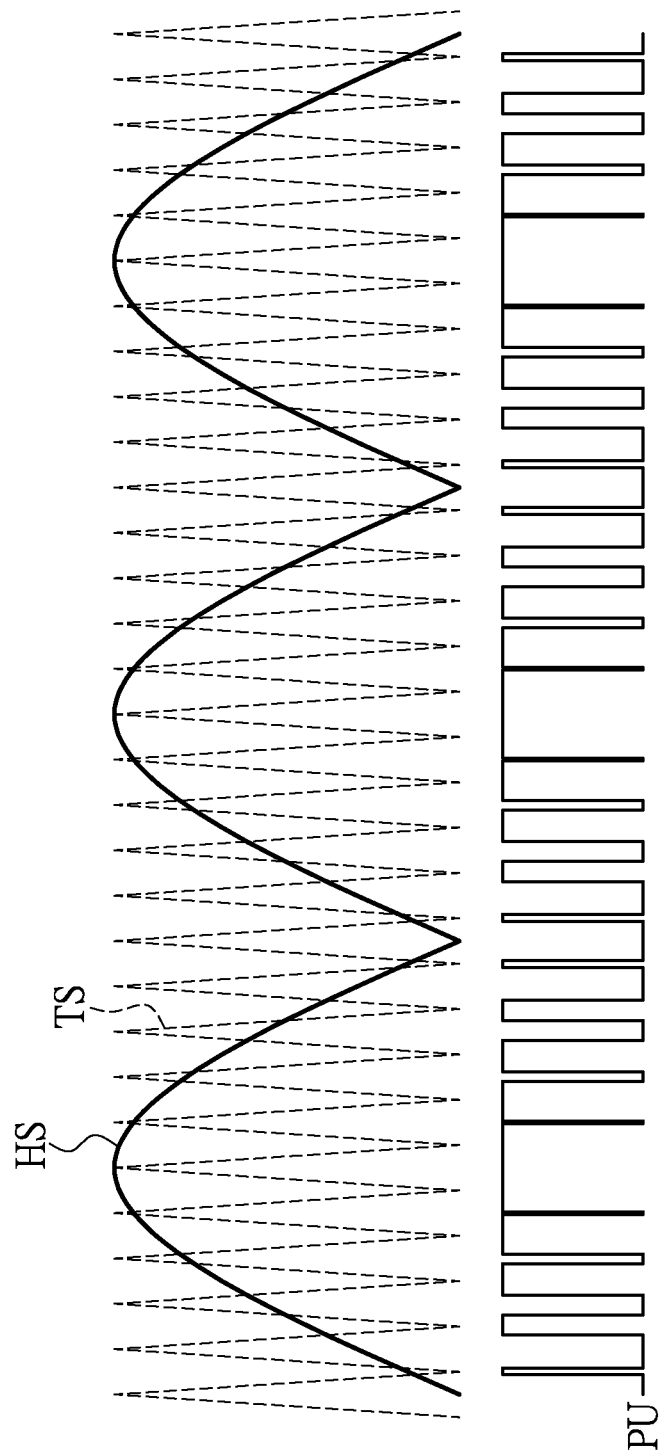
FIG. 6 shows a waveform schematic diagram for comparison of the positive full-wave signal and the triangular wave signal according to an embodiment of the instant disclosure.

In more detail, referring to FIGS. 4A and 6. FIG. 6 shows a waveform schematic diagram for comparison of the positive full-wave signal and the triangular wave signal according to an embodiment of the instant disclosure. As shown in FIG. 6, when amplitude of the positive full-wave signal HS is larger than or equal to that of the triangular wave signal TS, the first comparator DP outputs the pulse width modulation signal PU with high voltage level. On the contrary, when amplitude of the positive full-wave signal HS is smaller than or equal to that of the triangular wave signal TS, the first comparator DP outputs the pulse width modulation signal PU with low voltage level. Therefore, duty ratio of the pulse width modulation signal PU is gradually increased from zero to a predetermined value and then is gradually decreased from the predetermined value to zero. For example, in one embodiment, duty ratio of the pulse width modulation signal PU is gradually increased from 0% to 100%, and then duty ratio of the pulse width modulation signal PU is gradually decreased from 100% to 0%. In short, duty ratio of the pulse width modulation signal PU is determined by a cross-point formed by the positive full-wave signal HS and the triangular wave signal TS. Accordingly, a person skilled in the art may adaptively change frequency of the triangular wave signal TS or the positive full-wave signal HS according to demand, so as to generate a pulse width modulation signal PU with different duty ratio, and frequency of the triangular wave signal TS or the positive full-wave signal HS is not limited in the present embodiment.

Furthermore, when voltage level of the phase-changing signal HC' is high voltage level, phase of the second direction driving signal D2S is opposite to that of the pulse width modulation signal PU (from 0% to 100% to 0%); which means, duty ratio of the second direction driving signal D2S is also gradually decreased from 100% to a duty ratio anti-phase value (e.g. 0%) and then is gradually increased from the duty ratio anti-phase value (e.g. 0%) to 100%. On the other hand, when voltage level of the phase-changing signal HC' is low voltage level, phase of the first direction driving signal D1S is opposite to that of the pulse width modulation signal PU (from 0% to 100% to 0%); which means, duty ratio of the first direction driving signal D1S is also gradually decreased from 100% to a duty ratio anti-phase value (e.g. 0%) and then is gradually increased from the duty ratio anti-phase value (e.g. 0%) to 100%. Accordingly, after the first direction driving signal D1S and the second direction driving signal D2S are transmitted to the driving circuit 320 by the switching circuit 316 in different time intervals (e.g. t11-t12-t21 and t22), the driving circuit 320 modulates the first output signal VOUT1' to the signal equivalent (or similar) to the sinusoidal signal with positive half-wave in the time interval t12 and t22, and modulates the second output signal VOUT2' to the signal equivalent (or similar) to the sinusoidal signal with positive half-wave in the time interval t11 and t21. In the instant disclosure, phase difference between the first output signal VOUT 1' and the second output signal VOUT2' is 180 degrees, so the single-phase DC motor control circuit 310 is able to alternatively output the first output signal VOUT1' and the second output signal VOUT2' to the single-phase DC motor 330, so as to make the single-phase DC motor 330 operate and avoid generating sharp change phenomenon for current of the single-phase DC motor 330.

Figure 7:
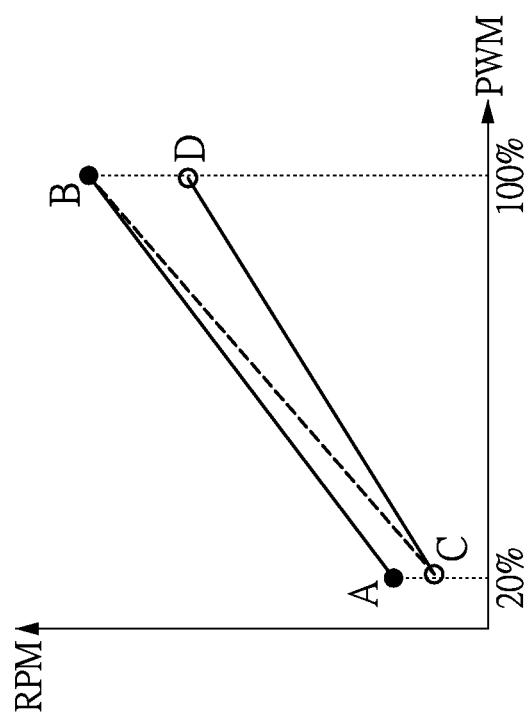
FIG. 7 shows a waveform schematic diagram for the speed of the DC motor versus the PWM duty of the control signal according to the DC motor control method of an embodiment of the instant disclosure.

Please refer to FIG. 7, FIG. 8A, FIG. 8B, FIG. 8C and FIG. 8D. FIG. 7 shows a waveform schematic diagram for the speed of the DC motor versus the duty ratio of the control signal according to the DC motor control method of an embodiment of the instant disclosure. The vertical axis in FIG. 7 is the speed of the DC motor (RPM), the horizontal axis is the duty ratio of the pulse width modulation signal PWM. FIG. 8A, FIG. 8B, FIG. 8C and FIG. 8D respectively show a waveform schematic diagram of the DC motor control method operating in the corresponding operating point A, B, C and D according to an embodiment of the instant disclosure. The circuit shown in the embodiment in FIG. 4A is for replacing the conventional circuit shown in FIG. 1. In other words, the pulse width modulation signal PU' of the embodiment in FIG. 4A is for replacing the pulse width modulation signal PW in FIG. 1, wherein the horizontal axis PWM can be the duty ratio of the pulse width modulation signal PW in FIG. 4A and FIG. 1. However, as mentioned above, utilizing conventional control mechanism would generate sharp change phenomenon for current of the single-phase DC motor in the phase-changing duration.

Figure 8A:
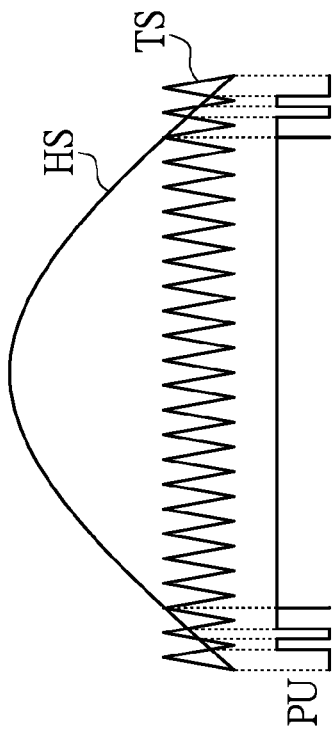
FIG. 8A shows a waveform schematic diagram of the DC motor control method operating in the operating point A according to an embodiment of the instant disclosure.
Figure 8B:
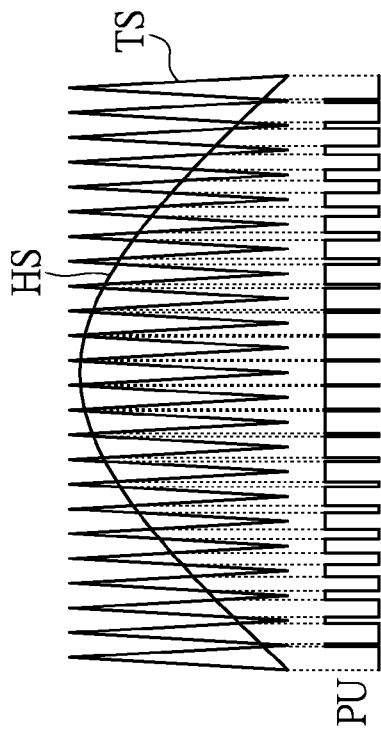
FIG. 8B shows a waveform schematic diagram of the DC motor control method operating in the operating point B according to an embodiment of the instant disclosure.
Figure 8C:
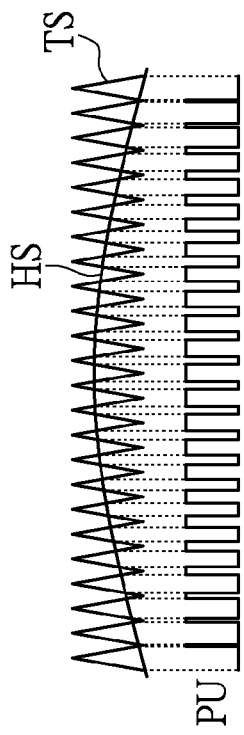
FIG. 8C shows a waveform schematic diagram of the DC motor control method operating in the operating point C according to an embodiment of the instant disclosure.
Figure 8D:
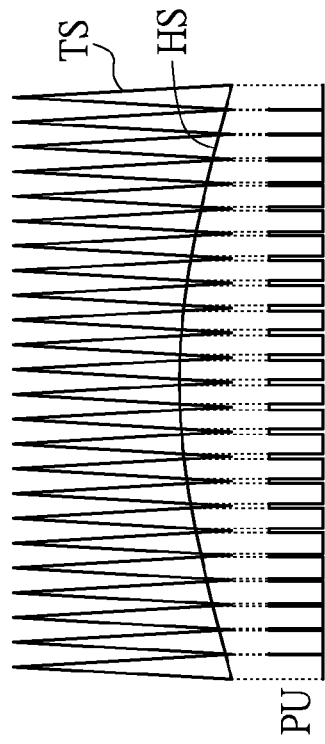
FIG. 8D shows a waveform schematic diagram of the DC motor control method operating in the operating point D according to an embodiment of the instant disclosure.

In order to avoid the sharp change phenomenon for current of the single-phase DC motor, according to the signal comparing operation of the embodiment in FIG. 6, when amplitude of the positive full-wave signal HS is smaller than or equal to that of the triangular wave signal TS, the DC motor operates in the operating point C while the maximum duty ratio of the pulse width modulation signal PU is 20%, wherein the ratio of the amplitude of the positive full-wave signal HS to the amplitude of the triangular wave signal TS is shown in FIG. 8C. When the speed of the DC motor is needed to be increased, the ratio of the amplitude of the positive full-wave signal HS to the amplitude of the triangular wave signal TS can be controlled, so as to change the operating point of the DC motor to the operating point D, for example, increasing the positive full-wave signal HS to approach or be equal to the amplitude of the triangular wave signal TS, at this time the ratio of the amplitude of the positive full-wave signal HS to the amplitude of the triangular wave signal TS is shown in FIG. 8D. On the other hand, when amplitude of the positive full-wave signal HS is set to be smaller than or equal to that of the triangular wave signal TS, even though the operating point of the DC motor can maintain a linear change (from point C to point D), and the current of the DC motor can be smoothed for obtaining the very quiet noise (because the current of the DC motor changes in sinusoidal and the current would change slowly in the phase-changing duration), the pulse width modulation signal PU is not always maintained in the maximum, referring to FIG. 8D, the duty ratio of the pulse width modulation signal PU at the operating point D would changes from 0% to the maximum—100% and then changes from the maximum—100% to 0%, meanwhile the average duty ratio is the half of 0% and 100% (that is 50%) although the maximum duty ratio of the pulse width modulation signal is 100%. Thus, the speed of the DC motor is not controlled to the maximum speed (the speed of the operating point D is still slower than that of the operating point B). Even though the design of the DC motor itself can be modified for change the speed of the operating point D to the speed of the operating point B (for example, modifying the coil winding of the motor), the cost of the design of the DC motor may be increased accordingly.

Furthermore, in spite of the sharp change phenomenon for current of the single-phase DC motor, if it is needed to increase the speed of the DC motor for high speed requirement, by utilizing the control method of this embodiment to adjust the amplitude ratio of the positive full-wave signal HS to triangular wave signal TS, the operating point of the DC motor can be changed from the operating point C to the operating point B. As shown in FIG. 8A, compared to FIG. 8C, the amplitude ratio of the positive full-wave signal HS to the triangular wave signal TS is properly increased, in which the amplitudes of the positive full-wave signals HS in FIG. 8A and FIG. 8C are the same, and the amplitude of the triangular wave signal TS in FIG. 8C is decreased to obtain the amplitude of the triangular wave signal TS shown in FIG. 8A. In one embodiment, the pulse width modulation signal PW' in FIG. 4A can be utilized to digitally control the amplitude of the triangular wave signal TS, but the instant disclosure does not limit the bits of the digital signal, and the bits of the digital signal can be changed according to the design in practice. For example, an 8 bits (representing 0-255 in decimal) signal can be utilized for adjustment, the duty detector 122 detects the duty of the pulse width modulation signal PW for converting to the 8 bits pulse width modulation signal PW', the amplitude adjustment signal of the triangular wave signal TS in FIG. 8C is 255 in decimal, the amplitude adjustment signal of the triangular wave signal TS in FIG. 8A is 63 in decimal (about 255/4). Similarly, as shown in FIG. 8B, the amplitude adjustment signal of the triangular wave signal TS in FIG. 8B is 63 in decimal, but the amplitude adjustment signal of the triangular wave signal TS in FIG. 8D is 255 in decimal. Thus, compared to the operating point D in FIG. 8D, the pulse width modulation signal PU can make the DC motor operate at the operating point B (higher speed), thus the control method utilizes the pulse width modulation signal PU to make the maximum speed of the DC motor be the same as the maximum speed obtained by utilizing conventional control method (which is to only use the pulse width modulation signal PW in FIG. 1 or FIG. 4A), without changing the design of the DC motor itself (comprising the structure, the magnet, the coil and so on). In other words, in the high speed range (that is the PWM duty is higher), the equivalent duty of the pulse width modulation signal PU', the first output signal VOUT1', or the second output signal VOUT2' would be larger than the equivalent duty—50% of the operating point D, in order to achieve the high speed requirement. Meanwhile, although the equivalent waveform of the first output signal VOUT1' or the second output signal VOUT2' is not very close to sinusoidal wave, the noise requirement in high speed range is lower, and on the other hand the noise of the operating point B is still quieter than that of the conventional control method described in FIG. 1 and FIG. 2, thus the application requirement can be satisfied. Further, amplitude of the triangular wave signal TS of the operating point B can also be adjusted to meet the requirement of the application. Additionally, in slow speed range (that is the PWM duty is lower), the equivalent duty of the pulse width modulation signal PU', the first output signal VOUT1' or the second output signal VOUT2' would gradually approach to the equivalent duty of the operating point C as the PWM duty decreases (meanwhile the motor current IL would decrease and be gradually closer to the sinusoidal current when the PWM duty decreases), in order to meet the low-noise requirement in low speed, meanwhile the equivalent waveform of the first output signal VOUT1' or the second output signal VOUT2' would be close to the sinusoidal wave when the PWM duty decreases. It is worth mentioning that, when comparing FIG. 8B and FIG. 8D, it can be seen that making the amplitude of the positive full-wave signal HS be larger than the amplitude of the triangular wave signal TS would cause most of the duty of the pulse width modulation signal PU to be 100% in order to increase the speed of the DC motor, wherein the amplitude of the triangular wave signal TS in FIG. 8D is the same as the amplitude of the triangular wave signal TS in FIG. 8C. In other words, based on the control method of smoothing the motor current in this embodiment, not only can the operating point of the DC motor linearly change from the operating point A to the operating point B, or linearly change from the operating point C to the operating point D, but also the operating point of the DC motor can linearly change from the operating point C to the operating point B by utilizing the aforementioned method to adjust the positive full-wave signal HS and the triangular wave signal TS at the same time. Also, the maximum speed of the same DC motor would not be reduced when the control method of this embodiment is applied. Therefore, the control method of this embodiment can replace the conventional control method and has more product competitiveness.

Please refer to FIG. 7 in conjunction with FIG. 9A, FIG. 9A shows a waveform schematic diagram for the triangular wave signal varies as the duty when the DC motor control method is applied to PWM mode according an embodiment of the instant disclosure. As shown in FIG. 9A, the amplitude of the triangular wave signal TS can be varied according to the sine function (which decreases as the maximum duty of the pulse width modulation signal PU increases), in order to make the operating point of the DC motor change uniformly and linearly (that is along a straight line) from the operating point C to the operating point B. As shown in FIG. 9A, the amplitude of the triangular wave signal TS changes from 255 (in decimal) to 63 (in decimal) according to the sine function curve SS. Due to the sine wave characteristics of the positive full-wave signal HS, when the amplitude of the triangular wave signal TS varies in the form of sine wave the DC motor operating point changes uniformly and linearly (which is along a straight line in FIG. 7, for example the operating point change between the operating point C and B). In other words, when the PWM duty is changed, although the amplitude of the positive full-wave signal HS changes in proportional to the change of PWM duty, the positive full-wave signal HS is still the sinusoidal wave, meanwhile if the amplitude of the triangular wave signal TS changes in proportion to the sinusoidal wave, the variations of the two amplitudes are both according to the sinusoidal wave, thus change of the operating point between the operating point C and B would be close to linear variation due to the same change characteristics. It is worth mentioning that, in FIG. 9A, when the maximum duty of the pulse width modulation signal PW is 50%, the amplitude of the triangular wave signal TS is 197 (in decimal) which is larger than half of the maximum amplitude (255 in decimal). Additionally, when the duty of PWM is 100%, the amplitude of the positive full-wave signal HS is 255 (in decimal), and the amplitude of the triangular wave signal TS is 63 (in decimal). In other words, not only does the amplitude of the positive full-wave signal HS increase as the PWM duty increases, but also the amplitude of the triangular wave signal TS is adjustable, in which the amplitude of the triangular wave signal TS decreases as the PWM duty increases. The amplitude of the triangular wave signal TS decreases when the needed speed of the DC motor increases, the amplitude of the triangular wave signal TS increases when the needed speed of the DC motor decreases, and the amplitude of the triangular wave signal TS varies according to a sine function.

Please refer to FIG. 9B in conjunction with FIG. 9C. FIG. 9B shows a waveform schematic diagram for the triangular wave signal varies as the driving voltage when the DC motor control method is applied to voltage-controlled mode according an embodiment of the instant disclosure. FIG. 9C shows a waveform schematic diagram for the speed of the DC motor versus the voltage of the control signal according to the DC motor control method of an embodiment of the instant disclosure. When the DC motor is controlled by voltage (for example, the voltage is from the voltage VCC of the power supply), the driving signal for changing the speed of the DC motor is the variable driving voltage (VCC), such as the voltage range from 1.76 volt to 4.4 volt shown in FIG. 9C. Meanwhile, the analog voltage VCC of the power supply can be converted to a digital periodic signal through an analog-to-digital converter (ADC), in which the digital periodic signal is equivalent to the PWM duty signal shown in the horizontal axis in FIG. 9A, that is the horizontal axis in FIG. 9A is changed to the driving voltage (VCC). According to the aforementioned operation mechanism described in FIG. 7 and FIG. 9A, the operation in FIG. 9B and FIG. 9C are the same, the only change is the PWM signal to the variable driving voltage for driving the DC motor, thus the redundant information of the similar operation is not repeated, please refer to the foregoing description.

Please refer to FIG. 10A in conjunction with FIG. 10B. FIG. 10A shows a waveform schematic diagram for the amplitude of the triangular wave signal varies as the duty based on sine function according to the DC motor control method of an embodiment of the instant disclosure. FIG. 10B shows a waveform schematic diagram for the amplitude of the triangular wave signal varies as the duty based on linear function according to the DC motor control method of an embodiment of the instant disclosure. The vertical axes in FIG. 10A and FIG. 10B are the speed (RPM), the horizontal axes may be the driving voltage (VCC). As shown in FIG. 10A, when the DC motor is voltage-controlled, and the amplitude of the triangular wave signal TS changes according the sine function (curve SSA), and when maximum of the digital voltage VCC changes from 0 to 100%, the amplitude of the triangular wave signal TS is set to change from the maximum (the 8 bits digital signal representing 255 in decimal) to the zero amplitude (zero in decimal). Accordingly, when the maximum of the digital voltage VCC is 0%, the amplitude of the triangular wave signal TS is about 255 in decimal, and the power of the DC motor is about 50%. When the maximum of the digital voltage VCC is 50%, amplitude of the triangular wave signal TS is about 180 in decimal, and the power of the DC motor is about 75%. When the maximum of the digital voltage VCC is 100%, the amplitude of the triangular wave signal TS is about 0 in decimal, and the power of the DC motor is about 100%. The speed of the DC motor can change uniformly and linearly due to controlling of the driving voltage (VCC). On the other hand, when the amplitude of the triangular wave signal TS changes along the straight line function (curve SSB), and when the maximum of the digital voltage VCC changes from zero to 100%, the amplitude of the triangular wave signal TS would be set to change from the maximum (the 8 bits digital signal representing 255 in decimal) to zero amplitude (zero in decimal). Therefore, when the maximum of the digital voltage VCC is 50% of maximum, the amplitude of the triangular wave signal TS is about 127 in decimal (about 255/2), and the power of the DC motor would be larger than 75%, and it is obvious that the speed of the DC motor is not uniformly changing according to controlling of the driving voltage (VCC). It can be seen that when the amplitude of the triangular wave signal TS is not changing according to the sine function the speed of the DC motor would not change uniformly according to the controlling of the driving voltage (VCC).

According to above descriptions, the DC motor control method and the DC motor control circuit provided by the instant disclosure compares the positive full-wave signal and the triangular wave signal to generate the control signal for controlling the speed of the DC motor, and increase the speed of the DC motor, avoiding the sharply changing phenomenon for current of the DC motor. The DC motor control method and the DC motor control circuit provided by the instant disclosure can automatically change the speed of the DC motor, and the speed of the DC motor can be changed uniformly and linearly. Additionally, compared to the conventional pulse width modulation control method, the original maximum speed of the DC motor can be achieved through adjusting the amplitude ratio of the first periodic signal to the second periodic signal (for example, comparing the positive full-wave signal and the triangular wave signal), without modifying the design of the DC motor itself. Accordingly, the DC motor control method and the DC motor control circuit provided by the instant disclosure can dynamically adjust the sinusoidal current of the DC motor.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A DC motor control method, comprising:
   comparing a first periodic signal and a second periodic signal for generating a control signal, wherein the frequency of the first periodic signal is lower than the frequency of the second periodic signal; and
   configuring the amplitudes of the first periodic signal and the second periodic signal according to the needed speed of the DC motor, wherein increasing the ratio of the amplitude of the first periodic signal to the amplitude of the second periodic signal when the needed speed of the DC motor is increased, and decreasing the ratio of the amplitude of the first periodic signal to the amplitude of the second periodic signal when the needed speed of the DC motor is decreased.

2. The DC motor control method according to claim 1, wherein the first periodic signal is a positive full-wave signal.

3. The DC motor control method according to claim 2, wherein the second periodic signal is a triangular wave signal.

4. The DC motor control method according to claim 3, wherein the amplitude of the triangular wave signal is adjustable, decreasing the amplitude of the triangular wave signal when the needed speed of the DC motor is increased, increasing the amplitude of the triangular wave signal when the needed speed of the DC motor is decreased, and the amplitude of the triangular wave signal varies according to a sine function.

5. The DC motor control method according to claim 1, wherein the DC motor operates in a pulse width modulation mode, the control signal is a pulse width modulation signal, and the speed of the DC motor is controlled by the pulse width modulation signal.

6. The DC motor control method according to claim 1, wherein the DC motor operates in a voltage-controlled mode, the control signal is for generating a driving voltage to drive the DC motor, and the speed of the DC motor is controlled by the voltage value of the driving voltage.

7. The DC motor control method according to claim 1, wherein at least one of the first periodic signal and the second periodic signal is adjustable.

8. A DC motor control circuit, comprising:
   a positive full-wave signal generator, outputting a positive full-wave signal, wherein the waveform of the positive full-wave signal is a sinusoidal wave;
   a triangular wave signal generator, outputting a triangular wave signal, wherein the frequency of the positive full-wave signal is lower than the frequency of the triangular wave signal; and
   a first comparator, connected to the positive full-wave signal generator and the triangular wave signal generator, the first comparator used for receiving the positive full-wave signal and the triangular wave signal, and processing a comparison operation for the positive full-wave signal and the triangular wave signal to output a control signal;
   wherein the amplitudes of the positive full-wave signal and the triangular wave signal are configured according to the needed speed of the DC motor, wherein increasing the ratio of the amplitude of the positive full-wave signal to the amplitude of the triangular wave signal when the needed speed of the DC motor is increased, and decreasing the ratio of the amplitude of the positive full-wave signal to the amplitude of the triangular wave signal when the needed speed of the DC motor is decreased.

9. The DC motor control circuit according to claim 8, further comprising:
- a logic circuit, connected to a phase-changing signal, the logic circuit used for detecting the voltage level of the phase-changing signal and outputting a first logic signal, a second logic signal, a third logic signal and a fourth logic signal, wherein phase of the first logic signal is opposite to that of the second logic signal;
- a switching circuit, connected to the logic circuit, the switching circuit used for receiving the control signal, the first logic signal and the second logic signal, wherein the switching circuit generates a first direction driving signal according to the control and the first logic signal, and generates a second direction driving signal according to the control signal and the second logic signal; and
- a driving circuit, connected to the logic circuit and the switching circuit, the driving circuit used for receiving the first direction driving signal and the fourth logic signal and accordingly transmits a first output signal to the DC motor, and the driving circuit receives the second direction driving signal and the third logic signal and accordingly transmits a second output signal to the DC motor;
- wherein the first output signal and the second output signal are both the sinusoidal signal with positive half-wave, and phase difference between the first output signal and the second output signal is 180 degrees.

10. The DC motor control circuit according to claim 8, wherein the amplitude of the triangular wave signal is adjustable, decreasing the amplitude of the triangular wave signal when the needed speed of the DC motor is increased, increasing the amplitude of the triangular wave signal when the needed speed of the DC motor is decreased, and the amplitude of the triangular wave signal varies according to a sine function.

* * * * *